United States Patent [19]

Stough et al.

[11] Patent Number: 5,675,124
[45] Date of Patent: Oct. 7, 1997

[54] GROMMET FOR A FIBER OPTIC ENCLOSURE

[76] Inventors: Robert Eugene Stough, 7189 Chambers Hill Rd., Harrisburg, Pa. 17111; William Joseph Garver, 1012 Topview Rd., Harrisburg, Pa. 17112; Scott Allan Strickler, 22 S. Clinton St., York, Pa. 17404

[21] Appl. No.: 641,447

[22] Filed: Apr. 30, 1996

[51] Int. Cl.⁶ .................... H02G 15/08; H02G 15/13
[52] U.S. Cl. .................. 174/65 G; 174/93; 277/215; 277/192; 277/178
[58] Field of Search .................... 277/178, 192, 277/215; 174/91, 92, 93, 77 R, 65 SS, 65 G

[56] References Cited

U.S. PATENT DOCUMENTS

| | | | |
|---|---|---|---|
| 4,262,168 | 4/1981 | Bossard | 174/77 R |
| 4,492,816 | 1/1985 | Morel et al. | 174/92 |
| 4,701,574 | 10/1987 | Shimirak et al. | 174/93 |
| 4,704,499 | 11/1987 | Faust | 174/92 |
| 4,711,975 | 12/1987 | Morel et al. | 174/92 |
| 4,822,954 | 4/1989 | Rebers et al. | 174/93 |
| 4,831,215 | 5/1989 | Clark et al. | 174/92 |
| 4,857,672 | 8/1989 | Rebers et al. | 174/93 |
| 4,880,676 | 11/1989 | Puigcerver et al. | 428/35.7 |
| 4,914,261 | 4/1990 | Tokumaru et al. | 174/92 |
| 4,942,270 | 7/1990 | Gamarra | 174/93 |
| 4,988,834 | 1/1991 | Birch | 174/93 |
| 5,059,748 | 10/1991 | Allen et al. | 174/87 |
| 5,243,138 | 9/1993 | Guthke et al. | 174/99 R |
| 5,322,973 | 6/1994 | Dagan | 174/92 |

FOREIGN PATENT DOCUMENTS

9205609 4/1992 WIPO ................... 174/77 R

*Primary Examiner*—Thomas B. Will
*Assistant Examiner*—Christina Annick

[57] ABSTRACT

The invention comprises a sealing grommet having a body made of an elastomeric material. The body has two halves to be assembled together in a sealing arrangement. The halves have a cable receiving opening extending therethrough from one side to another side. The opening has an outer diameter with a series of pliable webs extending inwardly into the opening to form a cable receiving channel. The webs in a center of the halves are larger and extend further into the opening than the webs along the sides of the halves thereby making the channel narrower in the center of the halves than along the sides of the halves to enable a sealing relationship to be formed about a variety of cable sizes.

18 Claims, 8 Drawing Sheets

GROMMET FOR A FIBER OPTIC ENCLOSURE

FIELD OF THE INVENTION

The present invention relates to a grommet for sealing a fiber optic enclosure.

BACKGROUND OF THE INVENTION

Aerial splice enclosures for telecommunications cable, and more specifically for fiber optic cables, are of various design. U.S. Pat. No. 4,831,215 discloses an aerial enclosure having a seal disposed in each end of the enclosure to provide protection to the interior of the enclosure from moisture from the environment. The seals are provided in two halves which are received in either half of the aerial enclosure. The seals have ribs which extend interiorly into the opening to provide a good sealing relationship between the seal and the fiber optic cable.

U.S. Pat. No. 4,701,574 discloses a cable end seal which provides a barrier against water where the cable enters the enclosure. The seals are placed at the entry point for the cable and placed under compression in order to provide a good seal around the entry point for the cable.

What is needed is to provide a seal which can provide a good sealing engagement around fiber optic cables of varying sizes.

What is also needed is a plug to plug unused openings within the grommet to prevent water from entering an enclosure.

SUMMARY OF THE INVENTION

The invention comprises a sealing grommet having a body made of an elastomeric material. The body has two halves to be assembled together in a sealing arrangement. The halves have a cable receiving opening extending therethrough from one side to another side. The opening has an outer diameter with a series of pliable webs extending inwardly into the opening to form a cable receiving channel. The webs in a center of the halves are larger and extend further into the opening than the webs along the sides of the halves thereby making the channel narrower in the center of the halves than along the sides of the halves to enable a sealing relationship to be formed about a variety of cable sizes.

BRIEF DESCRIPTION OF THE DRAWINGS

Embodiments of the present invention will now be described by way of example with reference to the accompanying drawings, in which.

2

DETAILED DESCRIPTION OF THE INVENTION

Figures 1, 2:
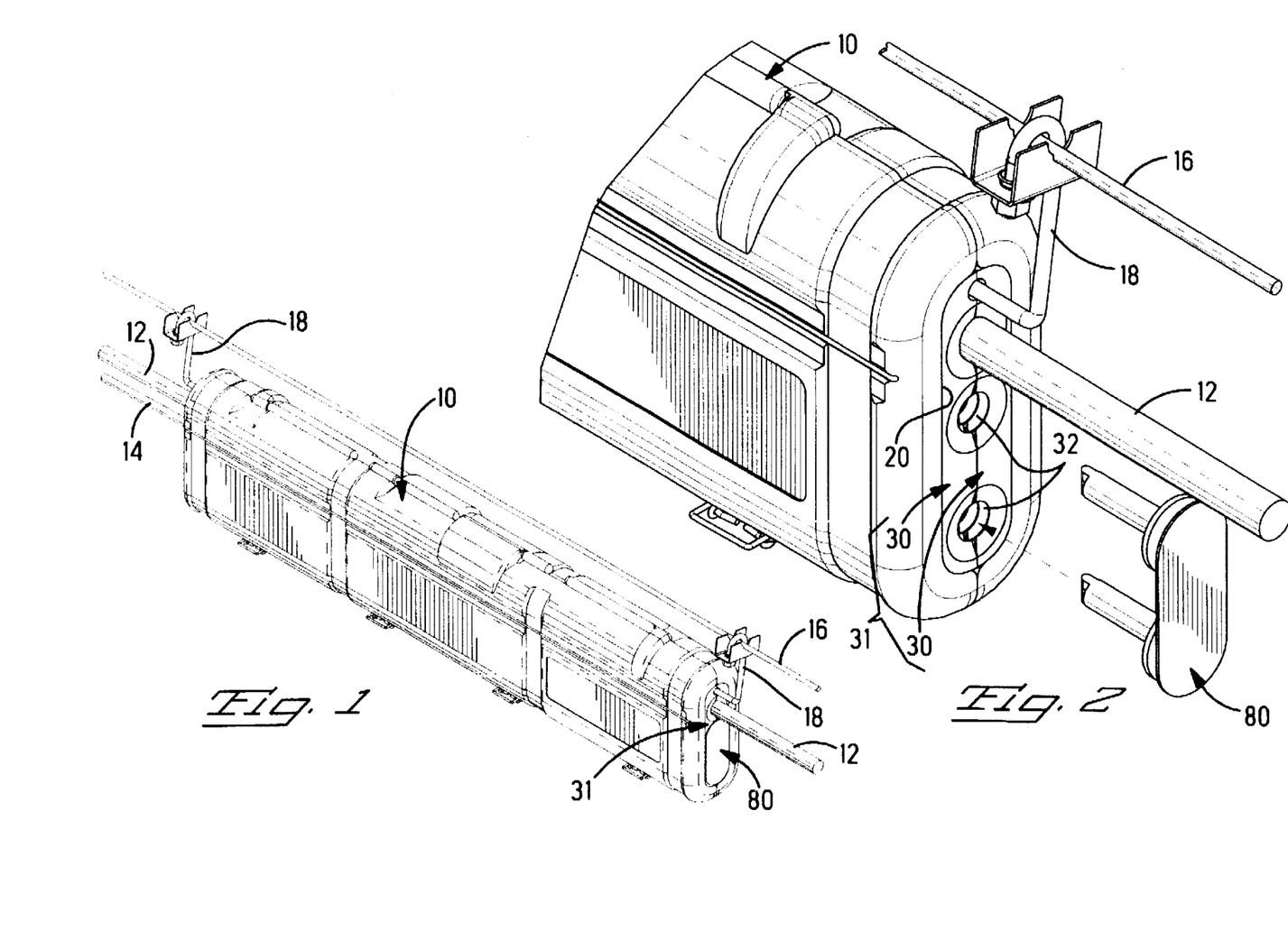
FIG. 1 is an isometric view of the enclosure of the present invention.
FIG. 2 is a partial isometric view showing the entry end of the enclosure with the grommet and plug of the present invention.

FIG. 1 shows generally a fiber optic splice enclosure 10 which is used along an aerial fiber optic cable 12. The fiber optic cable 12 is an aerial cable which is extended between utility poles. The fiber optic enclosure 10 is installed on the aerial fiber optic cable between the utility poles. The enclosure 10 is used to splice one or more optical fibers from the fiber optic cable 12 to a tap fiber of tap cable 14. The enclosure is secured to a messenger cable 16 and hangs from the cable 16 which extends between the utility poles also. The enclosure is secured to the cable by use of a hangar 18 which is connected from the fiber optic splice enclosure 10 to the auxiliary cable 16. The enclosure is a durable dielectric material which is made out of two halves which are hinged together along one side and latched together along the other side. The fiber optic cable and the tap fiber extend into the enclosure from either end of the enclosure through an entry portion.

Along either end of the enclosure, in the entry openings 20, are grommets 30 which are used to seal up the entry openings 20 around the fiber optic cable 12 and the tap cable 14 extending into the enclosure 10. The grommets on either end have three openings as is shown in FIG. 2. The openings 32 are designed to receive the fiber optic cable or a tap fiber therethrough. When the openings 32 are not being used, it is necessary to plug up the openings 32 to prevent moisture from getting inside the fiber optic enclosure 10. In order to accomplish this, plug 80 is secured into the opening 32 to prevent moisture from getting inside the enclosure 10. The enclosure 10 is secured along an aerial fiber optic cable 12 and it is therefore important to protect the inside of the enclosure 10 against driven rain. The grommet 30 and the plug 80 of the present invention are designed to provide this protection.

Figure 3:
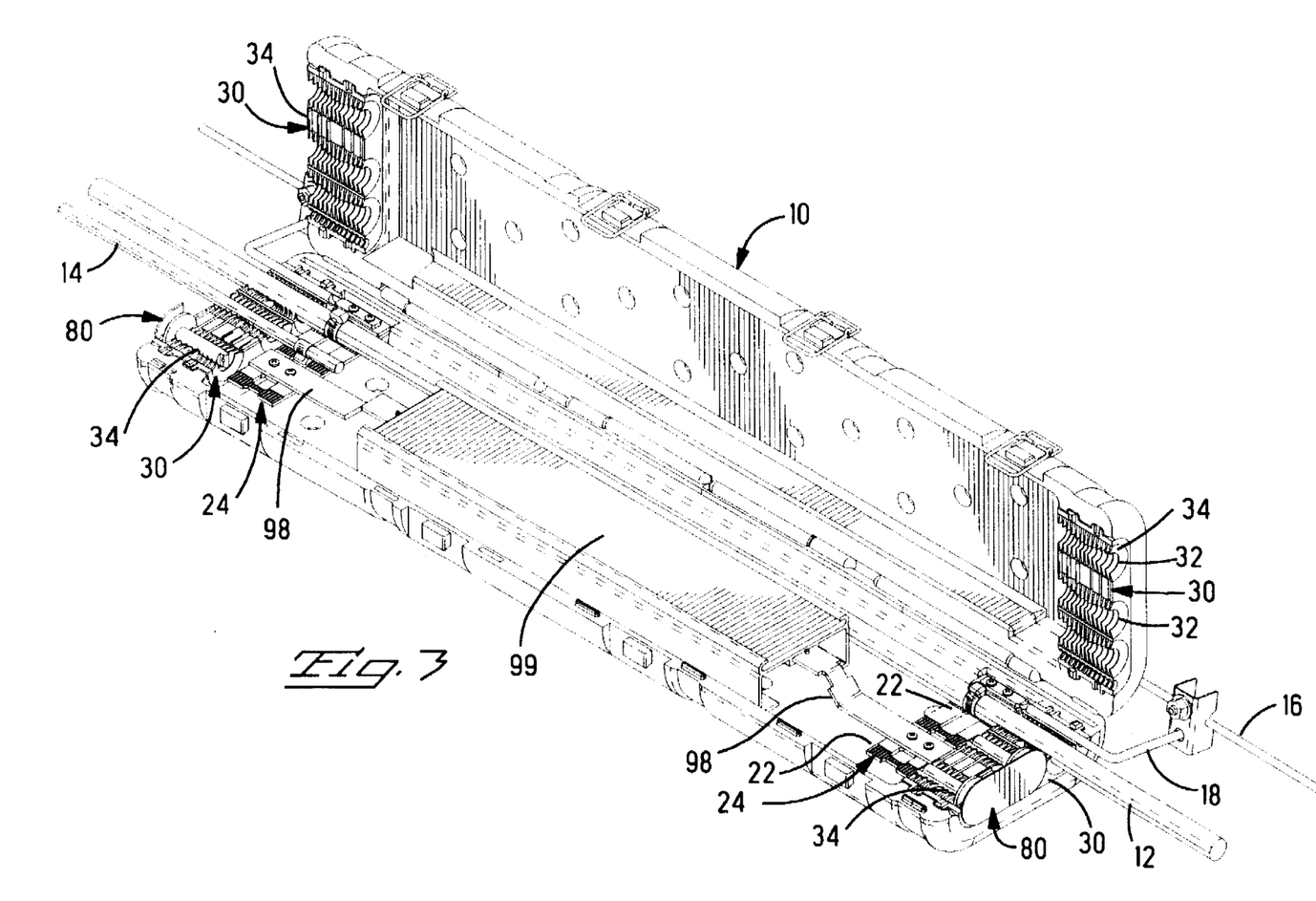
FIG. 3 is an isometric view showing the enclosure open with the grommet and plug of the present invention, and showing a representative fiber optic tray.

FIG. 3 shows the fiber optic enclosure 10 of the current invention with the hinged enclosure open. As can be seen more clearly, the two halves are secured together along the one side by hinges. The representative embodiment shows that the enclosure 10 has resilient latches for securing the enclosure closed. However, some other means could be used to secure the enclosure 10 such as screws, or any other type of closing means. The enclosure 10 is made out of a durable dielectric material as was described earlier. Preferably, it is a double layer, blow molded plastic enclosure to provide the strength needed to protect the fiber cables in the field.

The fiber optic enclosure 10 also includes a fiber optic splice tray represented at 99. The fiber optic splice tray 99 is used to splice an input fiber from the fiber optic cable 12 to a tap fiber from the tap cable 14, to provide service, for example, into a customer's home. The fiber optic splice tray 99 shown in FIG. 3 is a representative example. The fiber optic splice tray 99 of the current invention will be described more fully hereinafter.

Figure 5:
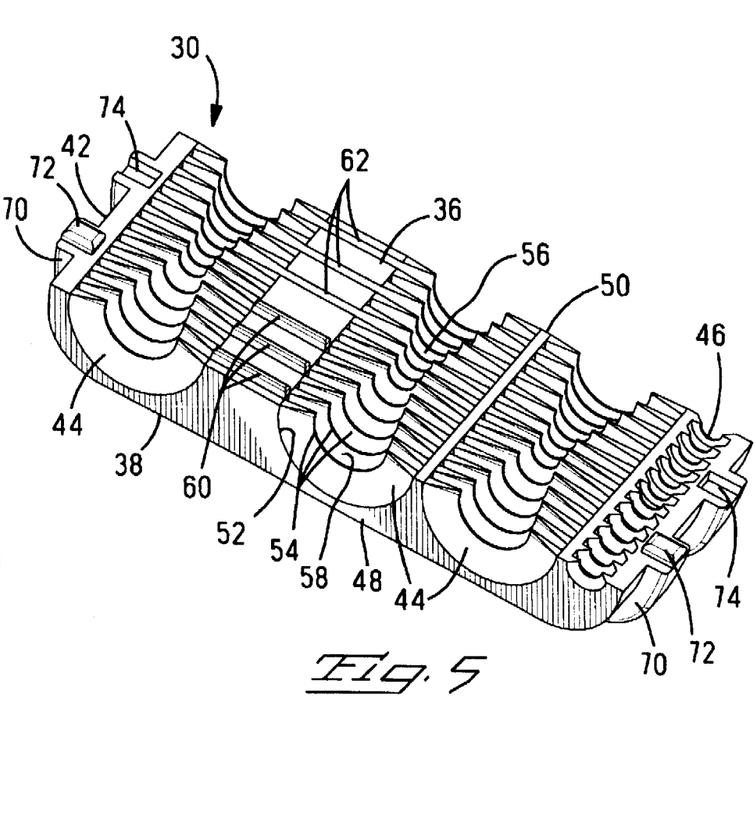
FIG. 5 is an isometric view of the grommet.

The grommet 30 of the present invention will now be described in more detail. The grommet 30 has a two part body 31 which is secured in an end opening of the fiber optic enclosure 10. As was described earlier, the grommet 30 when closed has three openings 32 which extend from the exterior of the enclosure to the interior of the enclosure. The grommet 30 is made up of individual hermaphroditic halves 34, as seen in FIG. 3. The grommet has a front face 36 and a rearward face 38 and ends 42, as seen in FIG. 5. Along the front face 36 are channels 44. There are three channels 44 to receive either a fiber optic cable or a tap cable. A fourth channel 46, disposed along one end, is designed to receive an arm of the hanger 18 to provide a seal about the access for the hanger 18. The hangar 18 is used to secure the inside of the fiber optic enclosure 10, the fiber optic cable 12, and the fiber optic tray 99 to the auxiliary cable 16.

Each of the channels 44 comprise a series of webs 54 which extend from one side 48 to the other side 50. The channel 44 has an approximately constant outer dimension 52. Along the length of the channel 44, a series of webs 54 extend inwardly from the outer dimension 52 to an inner dimension of the individual web 54. As can be seen in FIG. 5, the webs 54 get larger as you move from one side, towards the center of the grommet 30, and then get smaller as you proceed to the opposite side. The effect of this is to provide a cable receiving channel 56 which gets narrower as you approach the center of the grommet 30. The individual webs 54 have spaces 58 therebetween.

The grommet is made of a pliable dielectric material which allow the webs 54 in combination with the spaces to flex about depending on the size of the cable received within the cable receiving channel 56. The grommet 30 can be made from silicone rubber, polyurethane, or any other material which would provide the necessary pliability. The grommet 30 also has a series of positioning teeth 60 and a series of positioning recesses 62. When two of the hermaphroditic halves are brought together, the positioning teeth 60 on one half are received within the positioning recess 62 on the other half thereby positioning the two halves of the grommet together and ensuring that they are correctly aligned and, further, keeping them secured against each other.

Figure 8:
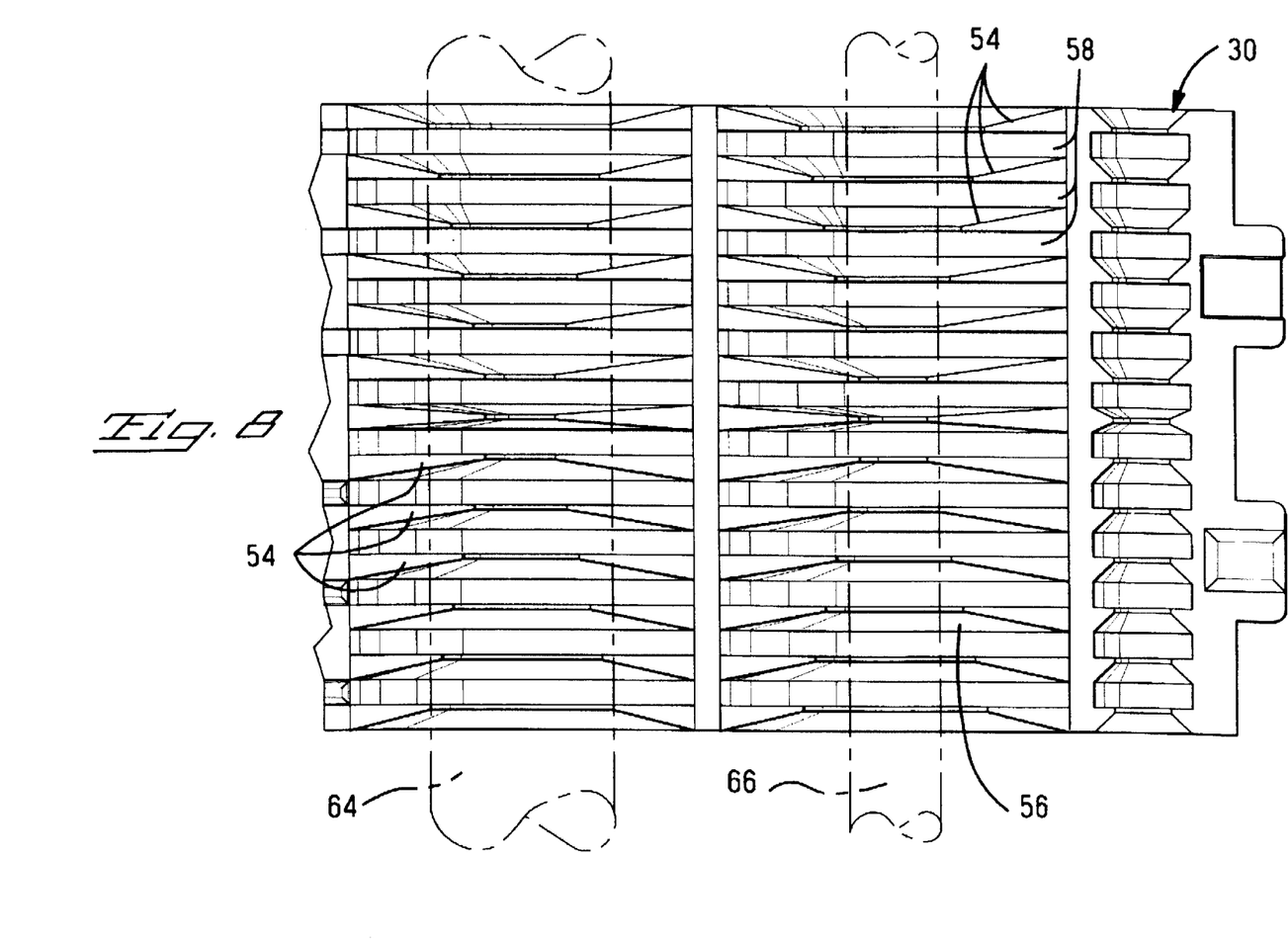
FIG. 8 is a top view of the grommet with representations of different sizes of cables that can be received within the grommet.

FIG. 8 is a representation of the effect of securing different size wires within the grommet 30. On the left hand side of FIG. 8 it can be seen that a relatively larger cable is received within the cable receiving channel 56 as can be seen from the ghost outlines indicated at 64. When the cable 64 is received down within the channel 56, the cable 64 will engage the series of webs 54 almost all the way through the channel with the exception of the two outermost webs on either side of the grommet 30. Because the grommet is made out of a pliable dielectric material, the web along the center of the cable receiving channel will be pushed out of the way and conform around the outer periphery of the cable 64. The tight fit between the webs 54 and the cable 64 provides an effective seal against ingress of water from the exterior of the enclosure to the interior of the enclosure.

On the right hand side in FIG. 8, there is shown the effect of having the smaller cable diameter secured within the grommet 30. The smaller cable is shown along the right hand side of Figure and is represented by ghost lines at 66. As can be seen, the smaller cable engages only those webs which are along the very center of the cable receiving channel 56, that is the center most five webs will engage the outer diameter of cable 66. These webs along the center will be deformed against the outer diameter of the cable, thereby providing a tight fit between those webs and the cable. This tight fit will also prevent ingress of water from the outer environment of the enclosure to the interior of the enclosure. Therefore the effect of the grommet of the current invention is to provide effect sealing means against cables of a varying diameters from ingress of water through the grommet.

Figures 6, 7:
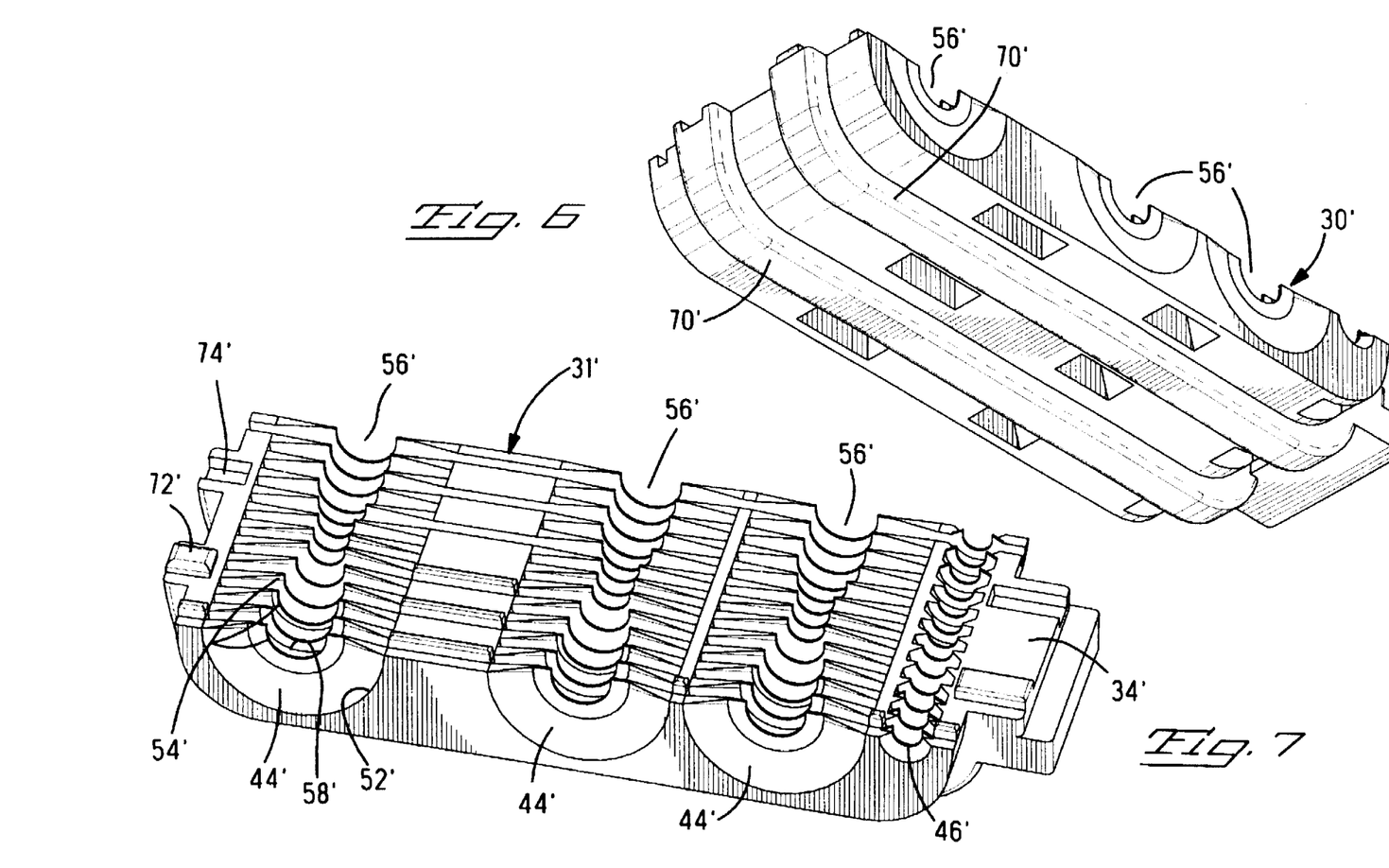
FIG. 6 is a rear view of an alternative embodiment of the grommet.
FIG. 7 is a front view of the alternative embodiment.

FIG. 7 shows an alternative embodiment of the grommet of the present invention. The grommet 30' is also made out of hermaphroditic halves 34' and forms openings 32' when two halves are brought together. The grommet also has channels 44' for receiving fiber optic cables and channel 46' for receiving an arm of the hanger. The channels have outer dimensions 52' which remain approximately continuous from one side of the grommet to the other side. The webs 54' extend from the outer dimension of the channel 44' into the interior of the channel 44' forming cable receiving channel 56'. Rather than having a smooth conical shape formed by the varying sizes of the webs, the first four webs along the outer side are approximately the same size. The next webs project further in towards the interior to form a narrower channel towards the center. It is not a continuous change from the outer most webs towards the center most webs, instead the change can be described as stepped from the outermost webs to the innermost webs. The four outermost webs are approximately the same size providing the cable receiving channel with approximately the same diameter in that region. The next web is a little bit larger providing a smaller channel. The inner three most webs are approximately the same size providing the narrowest portion of the channel 56'. While the dimensions of the webs 54' and grommet 30' vary from the early embodiment, the effect of the grommet is exactly the same. The centermost webs will engage the smallest diameter cable while a larger cable will engage both the centermost webs and also the webs along the outer side of the channel, thereby providing a good seal against the ingress of water on both small diameter cables and larger diameter cables.

FIG. 6 shows the rearward face of the grommet 30'. The rearward face has ribs 70' extending from one end to the other. The ribs are provided to retain the grommet 30' within the fiber optic enclosure 10. The fiber optic enclosure 10 has complementary recesses which receive the ribs 70' thereby keeping the grommet within the enclosure in the proper location and to provide a sealing engagement between the grommet 30' and the walls of the enclosure 10. Along ends of the ribs in either the embodiment shown in FIG. 5 or that which is shown in FIG. 7 are protrusion 72' and recesses 74'. When the hermaphroditic halves 34' are brought together in either the embodiments the protrusion 72' on one of the halves 34' will be received within the opening 74' on the mating hermaphroditic half 34 thereby providing additional alignment between the two hermaphroditic halves of the grommet and to secure the halves together. The embodiment of the grommet 30 shown in FIG. 5 has similar ribs 70, protrusions 72 and recesses 74 and will engage the enclosure 10 in a similar manner.

Figure 4:
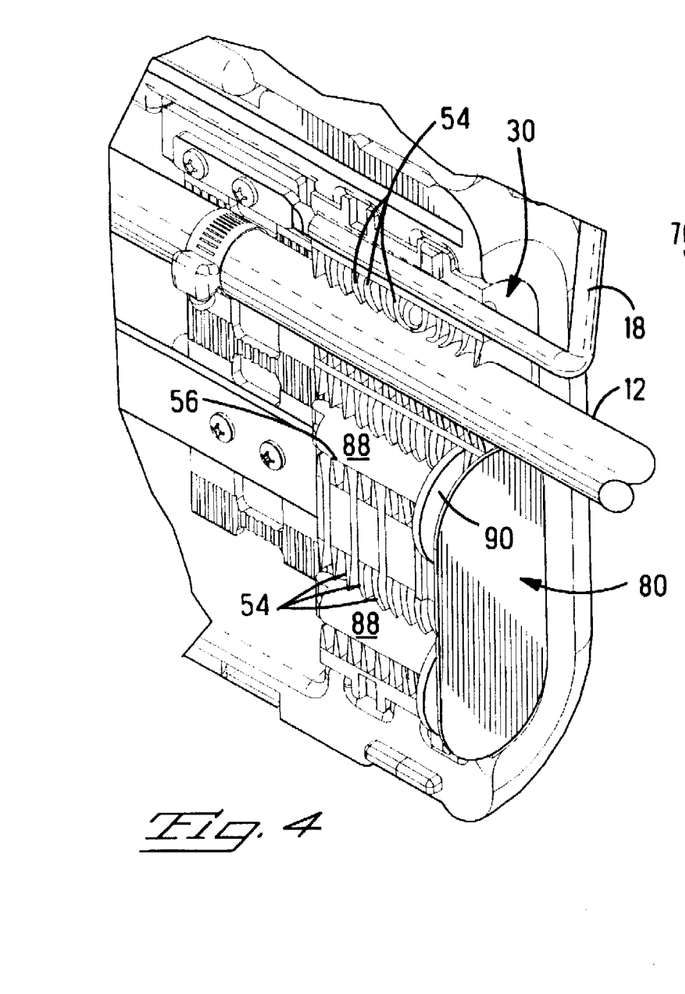
FIG. 4 is as isometric view showing the grommet and the plug installed within the enclosure.

The operation of the grommet within the enclosure 10 is shown in detail in FIG. 4. The grommet is received within the entry opening of the enclosure, one half 34 is received in one half of the enclosure, the other half of the grommet is received in the other half of the enclosure. The fiber optic cable is received in the cable receiving channel 56 displacing those webs with which it engages. Therefore, when the enclosure is closed, the two hermaphroditic halves 34 of the grommet 30 engage each other along the entry point of the enclosure thereby securing the cable within the grommet and preventing water from entering the interior of the enclosure.

Figure 9:
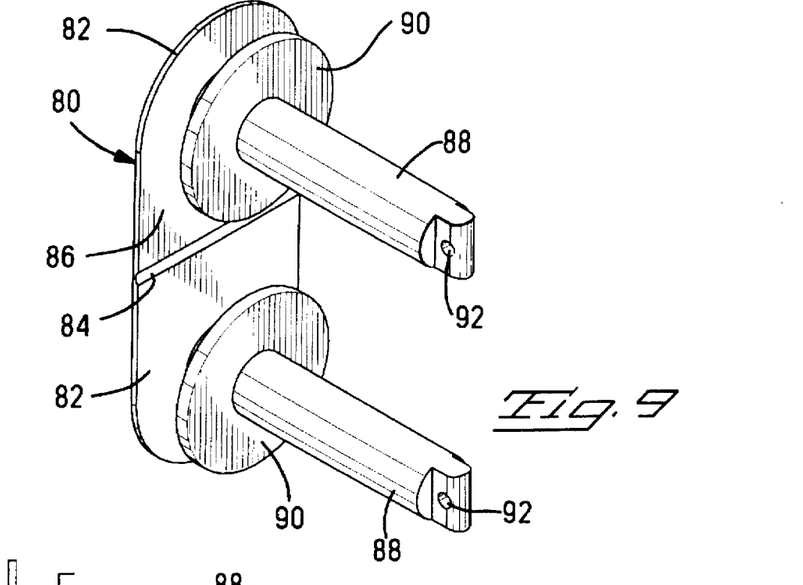
FIG. 9 is an isometric view of the plug of the present invention.
Figures 10, 11:
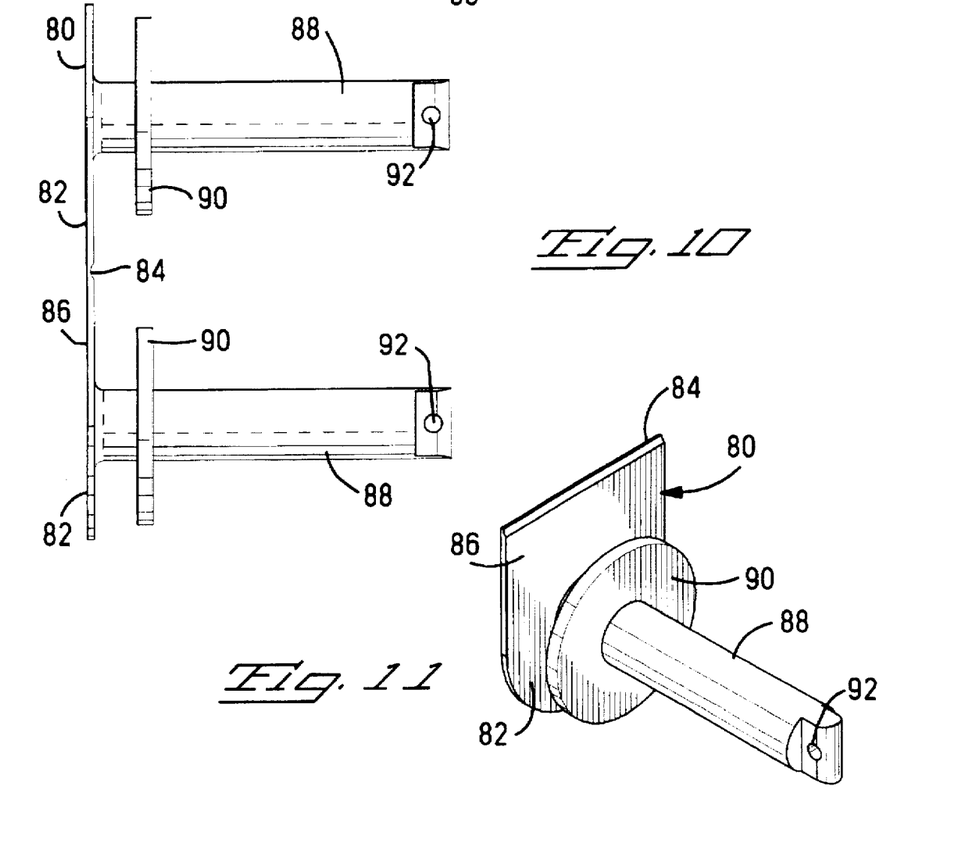
FIG. 10 is a side view of the plug.
FIG. 11 is an isometric view of one half of the plug.

As can be seen in FIG. 3, when the enclosure has one fiber optic cable 12 extending completely through and only one tap cable 14 extending into the enclosure 10, there are three additional openings 32 within the grommets 30 which are not being utilized. It is important to have these extra openings 32 to provide flexibility for the technician when installing the cable into the enclosure 10 from different directions. In order to prevent moisture from getting into the interior of the enclosure 10 through these openings 32, it is necessary to place a plug 80 within the openings. The plug 80 of the current invention is shown in FIG. 3, with further detail shown in FIGS. 4, 9-10. The plug 80 is made up of two halves 82 which are joined together at a break section 84. The break section 84 is a narrow piece of plastic which is designed to be broken in the event that only one half of the plug 80 is needed. FIG. 3 shows an example of where the whole plug 80 is used and also where one half of the plug is used. On the right hand side of the enclosure in FIG. 3 there are two openings 32 which need to be plugged. Therefore, the entire plug 80 is placed within these two openings, thereby sealing up both of the openings 32. On the other hand, on the left hand side of the enclosure, a tap fiber is extending through one of the openings 32 so therefore it is only necessary to use one half 82 of the plug 80 to secure up the additional opening 32. Therefore, the plug 80 is broken in half by placing a small amount of pressure along the break section 84.

The plug 80 has a wall 86 which acts as an outer sealing member and is received along the exterior of the grommet 30. The plug has a cylindrical tower 88 which extends from the interior portions of the wall 86. The two towers 88 are spaced from each other the same distance as two adjacent openings 32 on the grommet 30. Slightly offset from the wall 86 is disk 90 which extends from the cylindrical tower 88 and acts as an inner sealing member. The disk being an integral part of the cylindrical tower 88 but offset from the wall 86 thereby forming a space between the disk 90 and the wall 86. On the cylindrical tower 88, on the end opposite of the wall 86, is a hold down through hole 92. This hold down can be used to secure the plug 80 within the grommet 30 by a tie wrap secured to the inside of the enclosure or some other type of securing means.

The use of the plug 80 is shown in detail in FIG. 4. Whether the plug 80 is used as a whole or just as one half, the cylindrical tower 88 is received along the cable receiving channel 56 thereby engaging the webs 54 to provide a tight fit along the channel 44. To provide additional sealing, the disk 90 is received between two consecutive webs 54 spaced slightly off from the side of the grommet 30. In particular, the disk 90 is received between the second and the third web from the exterior side of the grommet 30 as is shown in FIG. 4. The wall 86 is received along the exterior side of the grommet 30 thereby completely sealing the openings 32 from ingress of moisture into the interior of the enclosure 10. The combination of the tower 88 being sealed against the webs 54 of the channel 44 and the disk 90 and wall provide effective sealing against driven rain. Additionally, the hold downs 92 can be secured on the inside of the enclosure by tie wraps which are not shown in FIG. 4. The plug 80 will operate in a similar fashion if it is first broken in half and used to only plug up one opening 32. The only difference being that only one of these plugs 80 will be used and the wall will only extend part way along the exterior of the grommet 30.

FIG. 3 shows a representative fiber optic splice tray 99 disposed on the interior of the fiber optic enclosure 10. This fiber optic splice tray 99 would house fiber optic splices for connecting an input fiber with an output fiber to direct optical impulses into the output fiber. These are typically used to provide the through signal to an output fiber directed to a converter box to convert the optical signal to an electrical signal for customer wiring in either a home or a business.

In FIG. 3, it can be seen that the represented fiber optic tray 99 includes extensions 98 on either side which are secured to a hanger portion 24. This hanger portion 24 is then secured to the hanger 18 which secures the fiber optic enclosures to the messenger cable 16. The hanger portion 24 has three serrated portions 22 such as alternating ribs and grooves over which the through fiber and the tap fiber are secured. The through fiber and the tap fiber are secured to the hanger portion 24 in these regions using hose clamps. The serrated portion provides a good gripping surface on which to secure the fibers. This prevents the fibers from slipping side to side in relation to the hanger portion 24. The hangar portion 24 is then secured to hangar 18 providing good support for the interior workings of the enclosure 10.

Figures 12, 13:
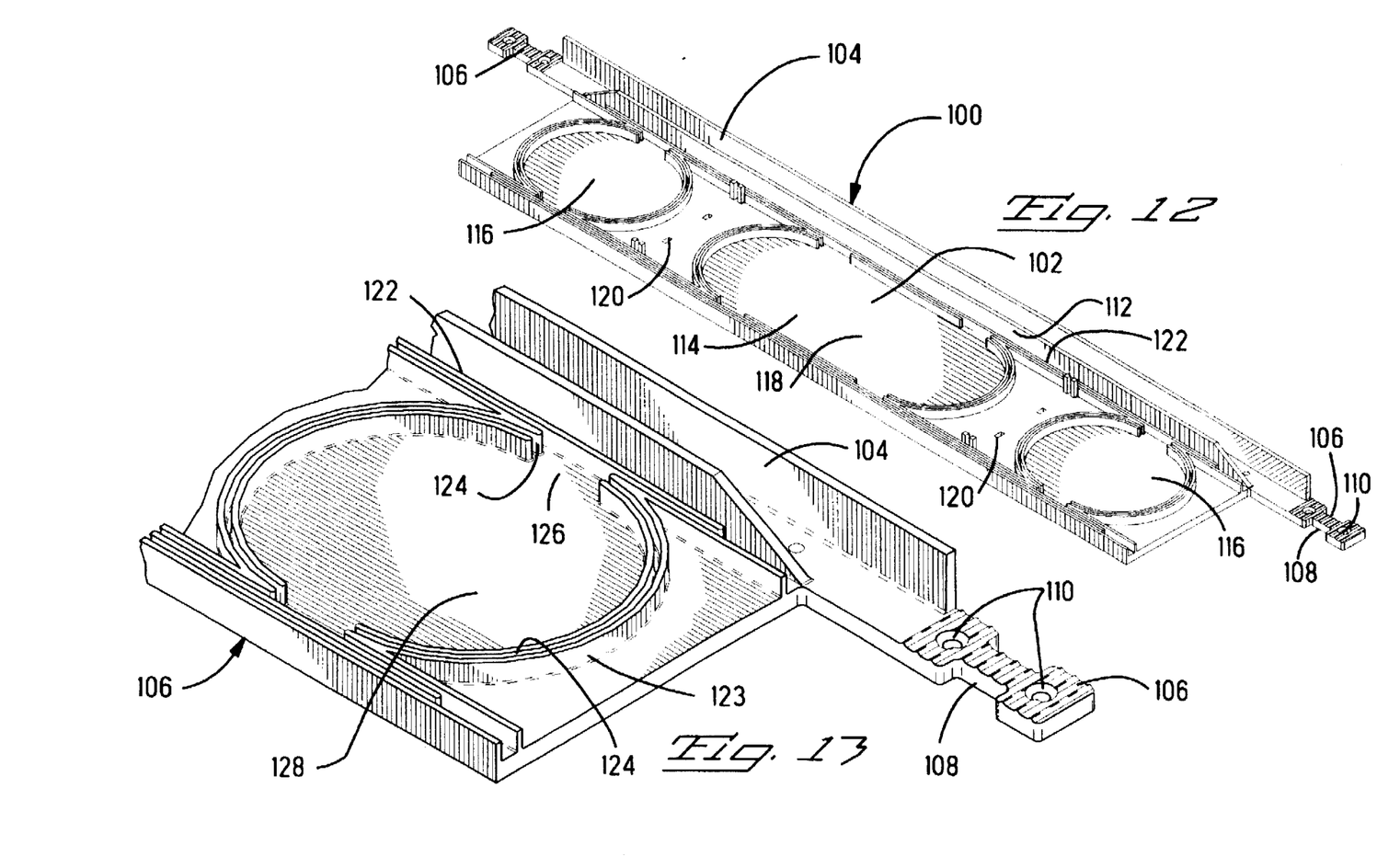
FIG. 12 is an isometric view of the fiber optic tray of the present invention.
FIG. 13 is a close up view showing one of the raceways of the present invention.

The fiber optic splice tray of the current invention will now be described with reference to FIGS. 12–16. FIG. 12 shows the fiber optic tray 100 of the present invention. The tray 100 has a front face 102 along which the fiber optic management system is disposed. Along one edge of the tray is express buffer channel 104. The express buffer channel runs from one end to the other along the one edge and provides a channel for receiving the express buffer fiber or the bundle of fiber optic cables that are not to be used as an input fiber, in other words, those fibers that will just be running through the enclosure without being modified. Along either end of the express buffer channel are serrated sections 106. The serrated sections have a series of grooves and ribs to form a textured surface along which the through fiber can be secured. The serrated sections have indentations 108 and through holes 110. These are used in cooperation with a hose clamp to secure the through cable to the tray 100. This will be combined with the hangar portion to connect the tray to the hangar and ultimately, to the messenger cable 16. A wall 112 separates the express buffer channel from the fiber optic management system 114 thereby preventing the through fiber from becoming intermingled with the input fiber and the tap fibers.

The fiber optic management system comprises three individual raceways 116 and 118. The smaller, more circular raceways 116, disposed on either end of the fiber optic management system, are to receive the input fiber which comes off of the through cable. The central raceway 116 is to receive the tap fiber from the tap cable 14. While the raceways are shown as being approximately circular or oval shaped, the raceways could be designed in any type of shape which allows the fibers to be retained and still maintain the appropriate bend radiuses. Disposed between the raceways 118 and 116 are fiber optic connector receiving areas 120. The receiving areas 120 are designed to receive a panel of fiber optic connectors 132 to connect the input fiber with the tap fiber. Disposed along wall 112 is an express fiber channel 122. The express fiber channel is a narrow channel designed to receive any of the fibers that are part of the bundle from which the input fiber is received, however, they will not be involved in the tap connection. Those fibers are received along the express fiber channel 122 and join the through fiber on either end of the tray 100.

Each of the raceways are designed using a series of walls 123 formed in circular or oval shapes defining narrow channels 124 therebetween. The shapes are designed to ensure that the optical fibers maintain the appropriate bend radiuses. The channels 124 are designed to receive the input fiber therein. An input optical fiber will be mounted within one of the raceways 116 on either end of the fiber optic management system. The raceway 116 to be used depends on the direction that the optical signal is traveling. The raceway 116 that will be used is that which is closest to the source of the optical signal. In FIG. 12, if the optical signal were going through the through fiber from right to left, the raceway 116 on the right side of the tray 100 would be the one to be used to manage the input fiber.

Figure 14:
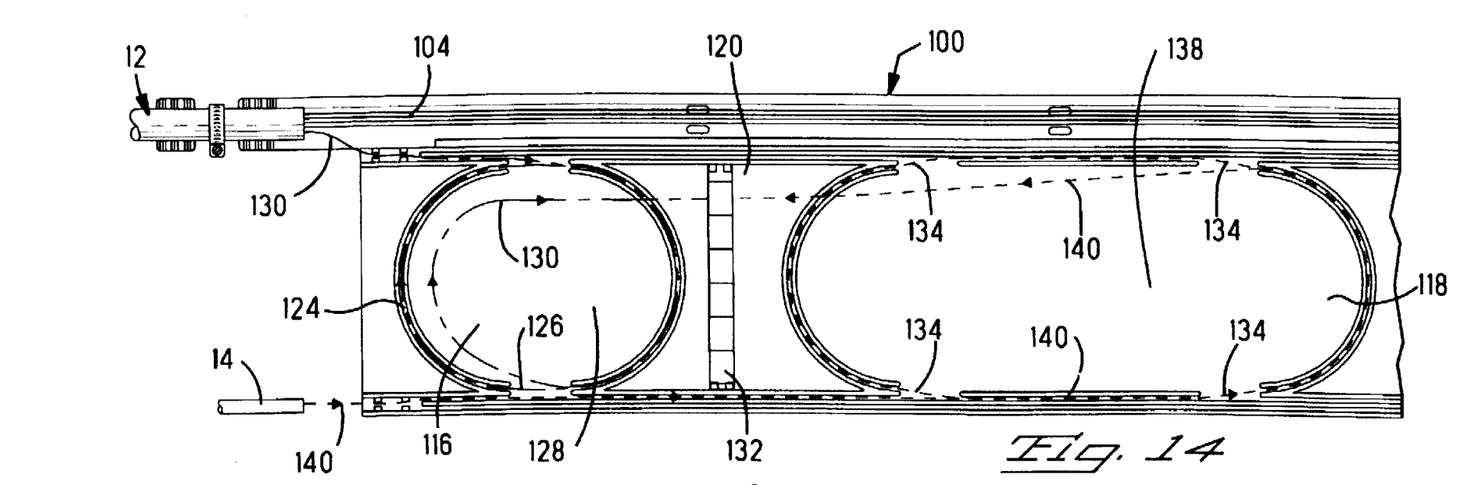
FIG. 14 is a top view of the fiber optic tray showing a representation of the optical fiber to be received within the tray.

FIG. 14 shows a representation of how the fibers will be installed within the channels. The input fiber 130 is threaded into the raceway 116 such that the fiber is received into the channel 124 between the upstanding walls 123. The input fiber 130 is arranged around the circle of the raceway 116 to take up any extra slack. When the end of the input fiber is reached, the input fiber is then threaded into the center portion of the raceway 116 by exiting out of the exit area 126. The exit area 126 is an opening between the walls of the raceway allowing the fiber to exit the channel 124 and enter the center portion 128 of the raceway. The fiber can be arranged within the center portion 128 to take up additional slack and to align the fiber for entry into one of the fiber optic splice connectors 132. The input fiber is then fed into the fiber optic connector 132 which is received in the fiber optic connector receiving area 120 and connected to the one side of the connector for splicing with the connector.

When it is time for another technician to install the tap fiber, it is not necessary for the technician to touch any of the input optical fiber 130 that has been installed in the raceway 116. At this point, the input fiber is completely secured inside its own management system and there is no need for any additional manipulation. The tap fiber 140 will be secured within raceway 118 separate from the raceway 116 such that the technician does not need to, in any way, manipulate the input fiber. The tap fiber is brought along the channels from either end of the tray 100 and is threaded through the raceway 118 and arranged in the channels in a circular fashion. Again when the end of the tap fiber is approached, it will exit out of the channels through the exit area 134 into the center portion 134 of the raceway 118 to be fed to the opposite side of the fiber optic connector 132 which is disposed in the fiber optic connector receiving area. Raceway 118 has four exit areas 134. These exit areas provide flexibility in storing the tap fiber within the raceway. If there is a lot of slack to be taken up within the raceway, the tap fiber can be weaved in and out of the raceway by entering and exiting the channels through the exit areas 128. Any extra slack can therefore be maintained also within the center portion 138 of the raceway 118.

Figures 15, 16:
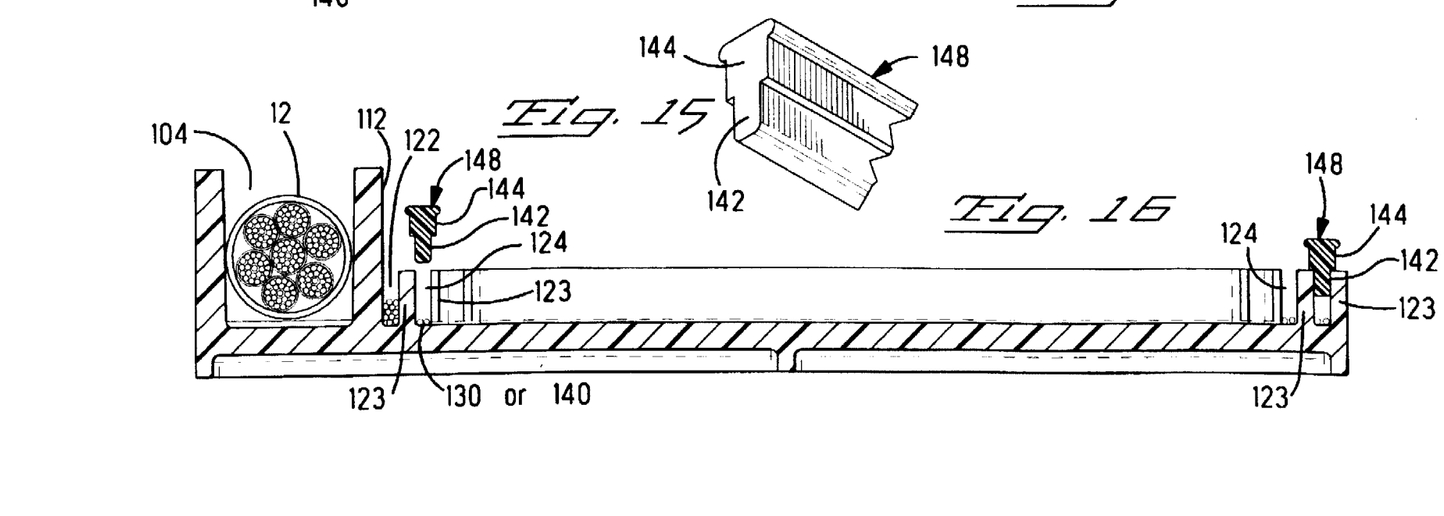
FIG. 15 is a partial isometric view of the raceway plug of the present invention.
FIG. 16 is a cross sectional view showing the raceway plug in conjunction with the raceway.

The typical fiber optic tray requires a cover to be received over the whole tray in order to ensure that the optical fibers are maintained in their correct position. In the fiber optic management system of the current invention, no such cover is necessary. The raceways define narrow channels 124 in which plug 148 can be received to secure the fiber optic cables within the channel. Plug 148 is made out of a flexible material which can be bent to fit within the curves of the raceway 116 or 118. Once the fibers are arranged in the raceways within the narrow channel, the plug can be pushed into the channels in an interference fit with the walls 123 of the channels 124 thereby securing the cables within the channels. The plug has a narrow section 142 and a handle section 144. The handle section 144 can be used by the technician to hold onto the plug. The narrow section 142 is received down in between the walls of the raceway within the channels 124 in an interference fit. The plug has a certain length shown and can be cut to accommodate the different lengths or whatever length is needed for the specific purpose. Alternatively, the plug can be cut into small pieces which can be distributed about the periphery of the raceway thereby conserving material.

The advantages of the fiber optic management system of the tray shown are that the technician who initially installs the fiber optic enclosure on the aerial fiber optic cable can also install the input cable within the fiber optic management system in a specified area. Later when it comes time to tap into the fiber optic cable such as to run a line to a customer's home or business, the technician who will install the tap fiber does not need to disturb the input fiber as it has already been installed in its necessary position. Instead, the technician can install the input fiber in a separate area in its own management system, thereby insuring that the cables do not get entangled or messed up to the identity of which cable is which. A further advantage of the fiber optic cable management system of the present invention is that it is not necessary to have a separate cover member to keep the fiber optic cables contained. The plug member can be cut to any length and be installed at different places throughout the raceway thereby eliminating the need for a separate cover. A further advantage of the present invention is that the tray can be secured directly to the through fiber within the fiber optic enclosure.

The grommet, plug and fiber optic management system of the present invention and many of its attendant advantages will be understood from the foregoing description. It is apparent that various changes may be made in the form, construction, and arrangement of parts thereof without departing from the spirit or scope of the invention, or sacrificing all of its material advantages.

What is claimed is:

1. A sealing grommet, comprising:
two halves each made of an elastomeric material to be assembled together in a sealing arrangement, the halves having a cable receiving opening extending therethrough from one side to another side, the opening having an outer diameter with a series of pliable webs extending inwardly into the opening to form a cable receiving channel, the webs in a center of the halves being larger and extending further into the opening than the webs along the sides of the halves thereby making the channel narrower in the center of the halves than along the sides of the halves to enable a sealing relationship to be formed about a variety of cable sizes.

2. The grommet of claim 1, wherein the webs have recesses therebetween to allow deflection of the webs when a cable is received within the cable receiving channel.

3. The grommet of claim 1, wherein the body is made from silicone rubber.

4. The grommet of claim 1, wherein the body is made from polyurethane.

5. The grommet of claim 1, wherein the body halves are hermaphroditic, each of the halves having a protrusion and each of the halves having a recess, when the halves are assembled together, the protrusion on one of the halves is received within the recess on the other of the halves, thereby securing and aligning the halves together.

6. The grommet of claim 1, wherein the opening extends along a front face of the body, the body having a rear face with retaining ribs extending therealong, the ribs providing alignment with an opening of an enclosure and providing sealing between the body and the enclosure.

7. The grommet of claim 1, wherein the body has an additional opening with webs extending therealong to form a second channel, the second channel being of equal diameter along the entire length of the second channel, whereby the second channel can receive a device of a given size.

8. The grommet of claim 1 wherein the cable receiving channel is profiled to be connical in shape between the center and each of the sides such that back to back connical sections are joined at the center to define a narrow section in the center.

9. The grommet of claim 1 wherein the cable receiving channel is profiled to have a wide portion at each of the sides and a narrow portion at the center such that a diameter of the narrow portion is smaller than a diameter of the wide portions whereby the channel extends between each of the wide portions and the narrow portion in a series of steps, each of the steps having a discrete diameter.

10. A sealing grommet, comprising:

a body being made of an elastomeric material, the body having two halves to be assembled together in a sealing arrangement, the halves having a cable receiving opening extending therethrough from one side to another side, the opening having an outer diameter with a series of pliable webs extending inwardly into the opening to form a cable receiving channel, the webs become larger as they approach a center of the halves thereby making the channel narrower toward the center of the halves than along the sides of the halves to enable a sealing relationship to be formed about a variety of cable sizes.

11. The grommet of claim 10, wherein the webs have recesses therebetween to allow deflection of the webs when a cable is received within the cable receiving channel.

12. The grommet of claim 10, wherein the body is made from silicone rubber.

13. The grommet of claim 10, wherein the body is made from polyurethane.

14. The grommet of claim 10, wherein the body halves are hermaphroditic, each of the halves having a protrusion and each of the halves having a recess, when the halves are assembled together, the protrusion on one of the halves is received within the recess on the other of the halves, thereby securing and aligning the halves together.

15. The grommet of claim 10, wherein the opening extends along a front face of the body, the body having a rear face with retaining ribs extending therealong, the ribs providing alignment with an opening of an enclosure and providing sealing between the body and the enclosure.

16. The grommet of claim 10, wherein the body has an additional opening with webs extending therealong to form a second channel, the second channel being of equal diameter along the entire length of the second channel, whereby the second channel can receive a device of a given size.

17. The grommet of claim 10 wherein the cable receiving channel is profiled to be connical in shape between the center and each of the sides such that back to back connical sections are joined at the center to define a narrow section in the center.

18. The grommet of claim 10 wherein the cable receiving channel is profiled to have a wide portion at each of the sides and a narrow portion at the center such that a diameter of the narrow portion is smaller than a diameter of the wide portions whereby the channel extends between each of the wide portions and the narrow portion in a series of steps, each of the steps having a discrete diameter.

* * * * *